United States Patent
Kunath

[11] 3,795,813
[45] Mar. 5, 1974

[54] CHANGED PARTICLE OPTICAL IMAGING SYSTEM

[75] Inventor: Wolfgang Kunath, Berlin, Germany

[73] Assignee: Max-Planck-Gesellschaft Zur Forderung der Wissenschaften e.v. Gottingen, Gottingen, Germany

[22] Filed: Aug. 10, 1972

[21] Appl. No.: 279,369

[30] Foreign Application Priority Data
Mar. 16, 1973 Germany............................ 2213208

[52] U.S. Cl. ................................ 250/396, 250/311
[51] Int. Cl. ........................ H01j 37/26, G01n 23/00
[58] Field of Search...... 250/49.5 A, 49.5 C, 49.5 D

[56] References Cited
OTHER PUBLICATIONS

"Prinzip Eines Doppellinsenspektrometers Fuen b– und 8–Strahlen" by W. Bothe from Naturwissenschaften, Vol. 37, 1950, page 41.

*Primary Examiner*—William F. Lindquist
*Attorney, Agent, or Firm*—Kenyon & Kenyon Reilly Carr & Chapin

[57] ABSTRACT

An improved system for charged particle imaging of the type having an objective lens, an annular diaphragm for stopping down the objective lens except for an annular zone, and a first supplementary lens, located behind the annular caustic surface formed by rays of a hollow beam originating from the axis point in the object plane and passing through the objective lens and diaphragm, for focusing this beam at a point on the axis. The improvement includes a second supplementary lens of long focal length compared to that of the objective lens and so located behind the first-mentioned caustic surface as to generate an additional caustic surface in front of the first supplementary lens, thereby reestablishing the original ray order relative to the axis so that the sine condition for imaging an extended, near-axis area in the object plane can be met. The system is achromatic if the three lenses are located to satisfy the condition:

$$C_{F_{obj}}(r_0/f_0)^2 + C_{F_1}(r_1/f_1)^2 - C_{F_2}(r_2/f_2)^2 = 0.$$

A third supplementary lens of long focal length may be located behind the first supplementary lens to correct third order spherical errors, provide a real image, and permit an enlarged ring aperture with consequently improved contrast.

7 Claims, 8 Drawing Figures

CHANGED PARTICLE OPTICAL IMAGING SYSTEM

BACKGROUND OF THE INVENTION

The invention concerns improvements in a rotation-symmetrical, spherically corrected charged particle imaging system, in particular an electron-optical imaging system of the type having an objective lens which is stopped down by an annular diaphragm except for an annular zone and a first supplementary lens located behind the annular caustic surface, generated by the objective lens and annular diaphragm zone, of the hollow beam originating from the axis point of the object plane, and which focuses this beam on a point on the axis. Such an imaging system has been described by Bothe in "Naturwissen-schaften," Vol. 37, p. 41 (1950).

Up to now, all proposals for correcting the aperture error and the axial color error of electron objectives have been based on a theorem by Scherzer which states that magnetic or electric imaging fields which are rotation-symmetrical, free of space charge and constant in time always have a third-order, non-zero, positive aperture error and a first-order axial color error. These two errors can be corrected by deviating from these three properties. For example, the following approaches have been tried so far:

a. use of quadrupole-octopole fields (non-circular lenses), b. generation of space charges or arrangement of a cylindrical electrode along the optical axis, and c. use of high-frequency lenses.

Of these approaches, the non-circular lenses hold the greatest promise to reduce further the aperture and color errors of present-day electron objectives, which due to better and better designs are already small.

BRIEF DESCRIPTION OF THE DRAWINGS

Another approach to compensating for aperture error is the basis of the imaging system which Bothe has used in a so-called dual-lens $\beta$ spectrometer. This principle will be described here, as it is also applied in the imaging system according to the present invention. Referring to FIG. 1, in this prior art dual-lens $\beta$ spectrometer, two equal lenses 1 and 2 are used to focus a part of the electrons of a given impulse emanating from a $\beta$-ray source 0. The electron beam from source 0 is limited by a ring diaphragm 3 behind the objective 1. Of the hollow beam produced, only those rays are traced in FIG. 1 which are lying in a meridional plane; the total of these rays will be called the zone beam. The source 0 is situated between the objective lens 1 and its focal point F on the object side, so that with no diaphragm, near-axis rays diverge behind this lens (i.e., on the side away from the object). The aperture error of this lens causes rays from object 0 making increasing angles with axis 8 to be increasingly deflected behind the lens toward the axis. The ray which runs parallel to the axis between the two lenses 1 and 2 is called the principal ray of the zone beam. The rays adjacent to the principal ray with smaller distance from the axis in the objective 1 are still divergent when they leave the objective, while those with larger distance from the axis are convergent behind the objective. The rays mutually adjacent to the principal ray intersect about in the middle between the two lenses on the points of a caustic line 4, which is limited to a short distance; the caustic lines of all beams form a ring-shaped caustic surface.

Rays with a larger distance from the axis in objective lens 1 than that of the principal ray have a smaller distance from the axis in lens 2. The additional refraction caused by the aperture error of lens 2 deflects these rays less toward the axis than the principal ray due to their smaller distance from the axis, while they were deflected toward the axis more strongly by the aperture error of the objective lens. Exactly the opposite is true for rays with a smaller distance from the axis in objective lens 1 and larger distance from the axis in lens 2, again relative to the principal ray. The effect of this lens arrangement is therefore to mutually cancel the influence of aperture errors of equal magnitude in the two lenses on the combination of rays emanating from point 0 on the axis and going through the ring zones of the two lenses. The rays adjacent to the principal rays therefore intersect the optical axis in about the same point 5 behind lens 2.

Figure 1:
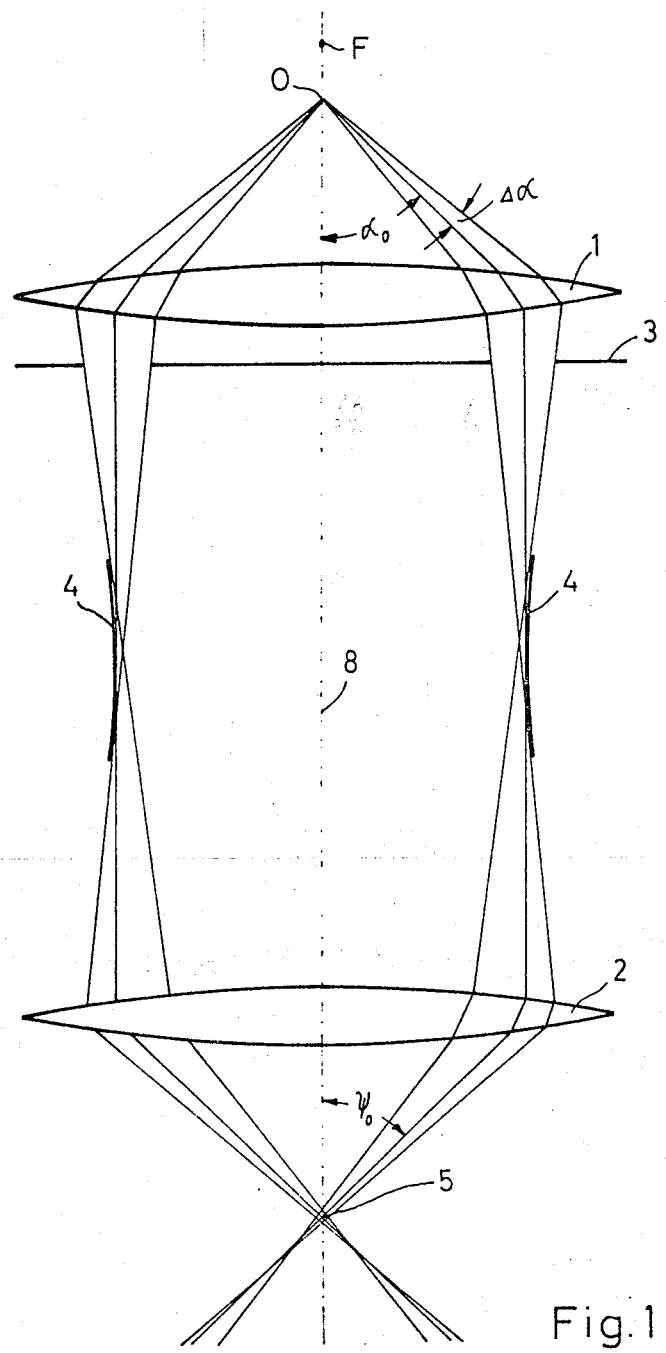
FIG. 1 is an equivalent optical ray diagram of the prior art imaging system of Bothe.

The principle of mutual cancellation of the influence of the aperture errors of two circular lenses of conventional design illustrated by FIG. 1 does not contradict Scherzer's theorem. The resulting third-order aperture error of the dual-lens system has the same sign as the third-order aperture errors of the individual circular lenses and is different from zero. Due to the combination of two lenses, however, large resulting aperture errors of the fifth and higher orders are produced, the signs of which are in part opposite to the sign of the resulting third-order aperture error. By using an annular aperture to form a hollow beam, the influences of these resulting third, fifth and higher-order aperture errors just cancel.

Lenz (Habilitation Dissertation, Aachen, 1957) has shown that with a ray configuration according to FIG. 1, second-order focusing is possible. This means that the deviation from the combination of the rays in one point at the focus does not depend on $\Delta\alpha$ in the first and second order, where $\Delta\alpha$ is the angle between a ray of the hollow beam and the principal ray. Because of shape of the caustic surface surrounding it, Lenz called this focus "cone edge focus" (see also Noven, Zeitschrift fuer angewandte Physik, 1964, p. 329 to 341).

The more or less sharp imaging of a small environment of the axis point 0 presupposes at least approximate fulfillment of the sine condition:

$$\sin \alpha / \sin \psi = \text{constant}$$

where $\alpha$ is the inclination with respect to the axis of a ray on the object side and $\psi$ that on the image side. In the ray configuration according to FIG. 1, the order of the rays with respect to the axis behind lens 2 is reversed from the order of the rays in front of lens 1. The sine condition is thus grossly violated. Hence the arrangement according to FIG. 1 produces an image of the axis point 0 at point 5, but it is unable to focus the image of an object which extends over a region in the object plane surrounding point 0.

SUMMARY OF THE INVENTION

The present invention improves the capability of the imaging system mentioned in the beginning to image sharply not only a point on the axis, but an extended object. This problem is solved according to the invention by providing behind the above-mentioned caustic surface a second supplementary lens with a focal length greater than that of the objective lens. The second supplementary lens causes a second reversal of the ray order and thereby generates a further annular caustic surface in front of the first supplementary lens, so that the order of the rays on the image side of the first supplementary lens is the same as that on the object side of the objective lens, and the sine condition can therefore be met.

Although the invention is presented with particular reference to imaging by means of electron beams, it also applies to imaging by ion beams. The lenses of the imaging system may be designed as electrostatic lenses as well as magnetic lenses. The imaging system is of particular importance for charged particle microscopes, particularly electron microscopes, where magnified imaging is required. In this case, the first supplementary lens, like the second supplementary lens, preferably has a focal length that is large as compared to that of the objective lens.

In a preferred embodiment of the invention the location of the objective and two supplementary lenses are chosen to satisfy the condition:

$$C_{F_{obj}}(r_0/f_0)^2 + C_{F_1}(r_1/f_1)^2 - C_{F_2}(r_2/f_2)^2 = 0,$$

so as to correct the system also for color errors.

In another preferred embodiment of the invention, a third supplementary lens of long focal length may be located behind the first supplementary lens to correct third order spherical errors and to provide a real image in place of the virtual image of a system having only two supplementary lenses when designed for high magnification.

DESCRIPTION OF THE PREFERRED EMBODIMENTS

Figure 2:
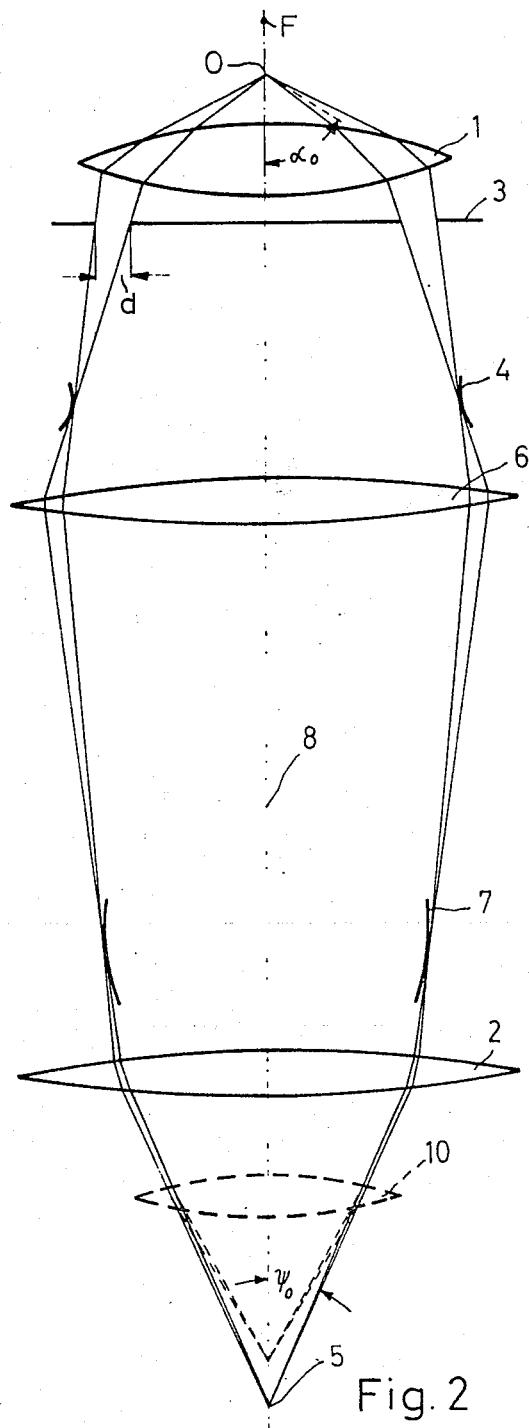
FIG. 2 is a ray diagram of a preferred embodiment of the present invention that traces the ray paths from a point on the axis in the object plane.

A first embodiment of the invention is shown in FIG. 2. The imaging system consists of three lenses: an objective lens 1 to be corrected and two supplementary lenses 2 and 6 for correction purposes. The specimen is placed within the focal length of the objective lens, as in the dual-lens $\beta$ spectrometer of Bothe. The solid beam of rays emanating from the axis point 0 of the object plane and passing through objective lens 1 is limited to a hollow beam by an annular diaphragm 3. Only the extreme rays of the zone beam will be traced in FIG. 2. The rays of the zone beam intersect behind the objective lens 1, due to its aperture error, in the points of a limited caustic line 4. Behind this caustic line the order of the rays is interchanged, with respect to axis 8. The aperture error of second supplementary lens 6 therefore counteracts the aperture error of the objective lens. The purpose of second supplementary lens 6 is to restore the order of the rays to what it was ahead of the objective lens 1.

Second supplementary lens 6 has a large focal length as compared to objective lens 1, so that the zone beam is deflected only slightly. The aperture error of lens 6 should be relatively large, so that the rays of the beam, which enter a peripheral zone of the lens divergently, intersect again at not too great a distance behind lens 6 along a second, short caustic line 7. After this intersection, the zone beam divergently enters a peripheral zone of the first supplementary lens 2, which then focuses the beam on the optical axis. First supplementary lens 2 should therefore have a large aperture error. It should also have a large focal length, so that the zone beam makes a small angle $\psi 0$ with the optical axis. The ratio of the sines of the inclination of the zone beam on the object side to that on the image side determines the magnification $M_o$ of the image 0, according to the equation:

$$M_o = \sin \alpha_o / \sin \psi_0.$$

As will be seen from FIG. 2, the zone beam images the axis point 0 three times. If one applies the two-dimensional concept of FIG. 2 to the entire hollow beam, it follows that caustic rings are generated in a first and in a second intermediate image plane that act as astigmatic images of the axis point 0 and that enclose the optical axis concentrically. The principal rays of all zone beams thus form the principal surface of the hollow beam, with the optical axis as the axis of symmetry.

Figure 3:
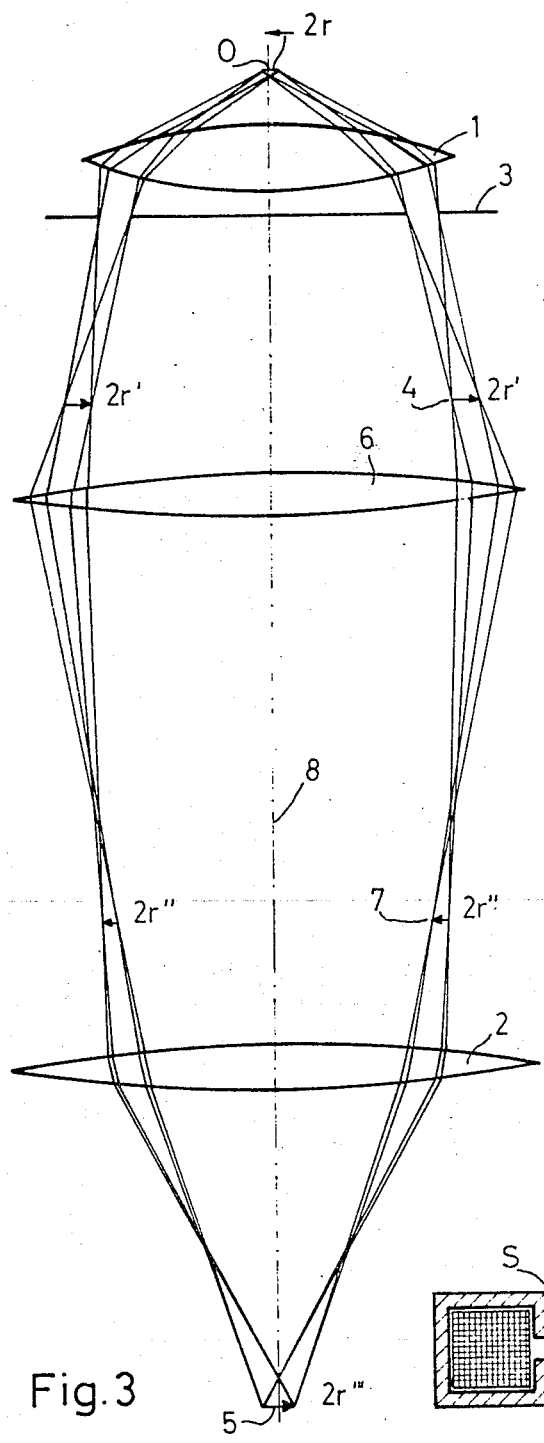
FIG. 3 is a ray diagram of the system of FIG. 2 that traces the ray paths from an extended source in the object plane.

The ray diagram of FIG. 3 shows the imaging of a region $2r$ about the axis point 9 of the object plane, situated in the meridional plane, through the imaging system shown in FIG. 2. The region is indicated by an arrow in order to show that the first intermediate image $2r'$, also situated in the meridional plane, is astigmatic and reversed, the second image, $2r''$, is astigmatic and upright, and the third image, $2r'''$ is stigmatic and reversed.

The magnification of each imaging stage is determined by the ratio of the image width to the object width, where both are to be measured along a principal ray of the zone beam. The product of the three individual magnifications $M_1$, $M_2$ and $M_3$ yields the overall magnification $M_{123}$, which is at the same time determined by the ratio $$M_o = \sin \epsilon_o / \sin \psi_o \text{ (see FIG. 2)}.$$

Therefore, $M_{123} = M_o$.

An important difference between correction of the aperture error in the vicinity of the axis and correction in the peripheral zone should be pointed out here. By correcting near the axis, the permissible aperture angle $\alpha$ is enlarged, and the resolution is therefore improved. In contrast, the aperture angle of the hollow beam can initially be chosen large, aiming at high resolution. However, blanking out the near-axis region by the central part of the ring diaphragm makes the contrast poorer. By correcting the aperture error of the ring zone, one obtains an increase of the permissible ring width and thereby an improvement of the contrast.

In the imaging system according to the invention, the radial width of the objective lens zone aperture ($d$, FIG. 2) is preferably chosen so that the wave aberration to the hollow beam is maximally $\lambda/4$, where $\lambda$ is the wavelength of the radiation to be imaged. For sharp imaging it is further advantageous to excite the lenses of the imaging system in such a manner that a cone edge focus is obtained in the image plane.

For the corrected imaging system consisting of three lenses according to FIGS. 2 and 3, the zone aperture error coefficient $C_{öz}$ for the hollow beam can be defined as follows:

$$q = M \cdot C_{öz} (\alpha - \alpha_o)^3 \equiv M \cdot C_{öz} \cdot \Delta\alpha^3, \text{ where}$$

$q$ denotes the radius of the aperture error disc in the image plane of the corrected imaging system, $M$ the magnification, $\alpha_o$ the inclination of a principal ray of the hollow beam in the specimen plane, and $\alpha$ the inclination of a ray adjacent to the principal ray. The aperture error disc depends on the third power of $\Delta\alpha$ inasmuch as the imaging system is spherically corrected to the second order. In contrast to the zone aperture error coefficients of the individual circular lenses, which according to Scherzer's theorem have basically positive signs, the zone aperture error coefficient $C_{öz}$ of the imaging system consisting of three lenses is negative. In other words, the system is slightly overcorrected.

This overcorrection can be compensated by adding a third supplementary lens behind the first supplementary lens, with a focal length which is large as compared to that of the objective lens. Due to the positive zone aperture error coefficient of this third supplementary lens, the negative third order zone aperture error coefficient of the three-lens imaging system can be cancelled. The imaging system consisting of an objective lens and three supplementary lenses is then spherically corrected to the third order. The third supplementary lens is indicated in FIG. 2 by broken lines and is designated by 10.

Figure 4:
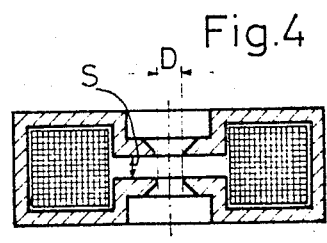
FIG. 4 is a schematic diagram of a magnetic lens suitable for the supplementary lenses of the invention.

We will now discuss the design of magnetic lenses which are suitable as supplementary lenses of large focal length for the imaging system according to the invention. Such a magnetic lens is shown schematically in FIG. 4. Its gap width is denoted by $S$, its bore diameter by $D$.

For all low-power lenses of large focal length, the quantity $$(C_ö/f^3) D^2$$

depends only on the ratio of the gap width $S$ to the bore diameter $D$, $C_o$ being the aperture error coefficient and $f$ the focal length. For a lens with $S/D = 1$, for instance, $$(C_ö/f^3) D^2 \approx 1.$$

As already shown above, the aperture errors of the supplementary lenses should be as large as possible, the focal lengths being fixed more or less by other requirements. From the above equation, a large aperture error requires that the bore diameter $D$ be as small as possible. At the same time, the bore must be larger than the hollow beam cross section. Thus, if low-power supplementary lenses are used, the resulting design lengths of the imaging system are on the order of 1 meter and more.

According to a preferred embodiment of the invention, therefore, lenses are used as magnetic supplementary lenses that have approximately telescopic lens power. Telescopic lens power is defined by the requirement that near-axis rays, entering the lens parallel to the axis, cross the axis within the field of the lens one or more times and exit from the lens again parallel to the axis. In these high power lenses, the gap-to-bore ratio is proportional to the quantity $$(C_ö/f^4) D^3$$

Thus, for the same bore diameter $D$, the aperture error coefficient $C_ö$ at telescopic lens power is proportional to the fourth power of the focal length, in contrast to the third power at low lens power. As a result, with telescopic supplementary lenses and with a total length of the imaging system of, for instance, 500 mm, the bore can be made 10 to 15 times larger than the diameter of the hollow beam, whereby it becomes possible also to correct possible out-of-round conditions of the lens fields in the region of the hollow beam by means of stigmators.

Figure 5:
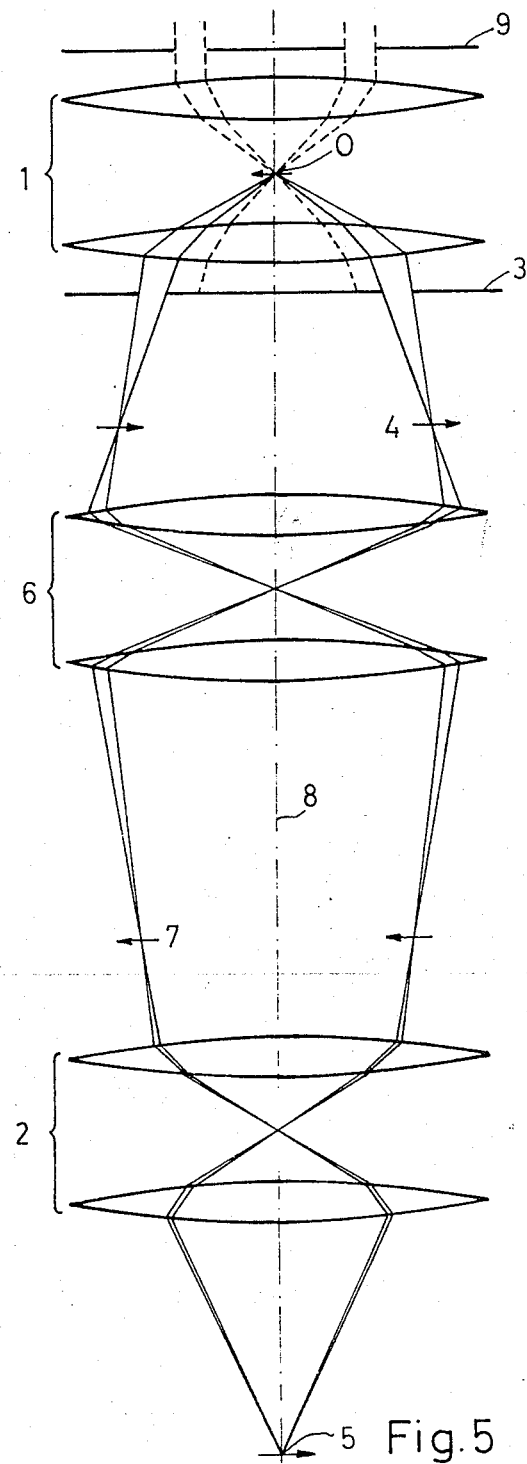
FIG. 5 is a ray diagram of an alternate embodiment of the invention having two supplementary lenses of telescopic power that traces the ray paths through each supplementary lens.

FIG. 5 shows an embodiment of the imaging system according to the invention in which supplementary lenses 2 and 6 have slightly overtelescopic lens power. A conventional single-field condenser objective, which has nearly the minimal aperture error that can be attained with a circular lens and full beam, is used as the objective lens 1. Such a single-field condenser objective is a lens in which the first part of the field, located in front of the object, acts as a condenser, and the second part of the field, located behind the object, acts as an objective. In order to reduce the loading of the object, an additional ring diaphragm 9 is arranged in front of lens 1.

For a $\beta$ spectrometer consisting of two equal lenses, Bothe showed in 1950 that the system is achromatic. The imaging system according to the invention is achromatic for certain refractive powers of the individual lenses if the following condition is met:

$$C_{F_{obj}} (r/f_0)^2 + C_{F_1} (r_1/f_1)^2 - C_{F_2} (r_2/f_2)^2 = 0,$$

where $C_{F_{obj}}, C_{F_1}, C_{F_2}$ are the color error coefficients for infinite magnification of the objective, first supplementary lens and second supplementary lens, respectively; $f_0$, $f_1$ and $f_2$ are the corresponding focal lengths; $r_1$ and $r_2$ are the distances from the axis of the principal surface of the hollow beam in the corresponding supplementary lenses; and $r_0$ is the distance from the axis of the principal surface in the exit diaphragm plane of the objective lens, assumed to be in the field-free space (see FIG. 6).

Figure 6:
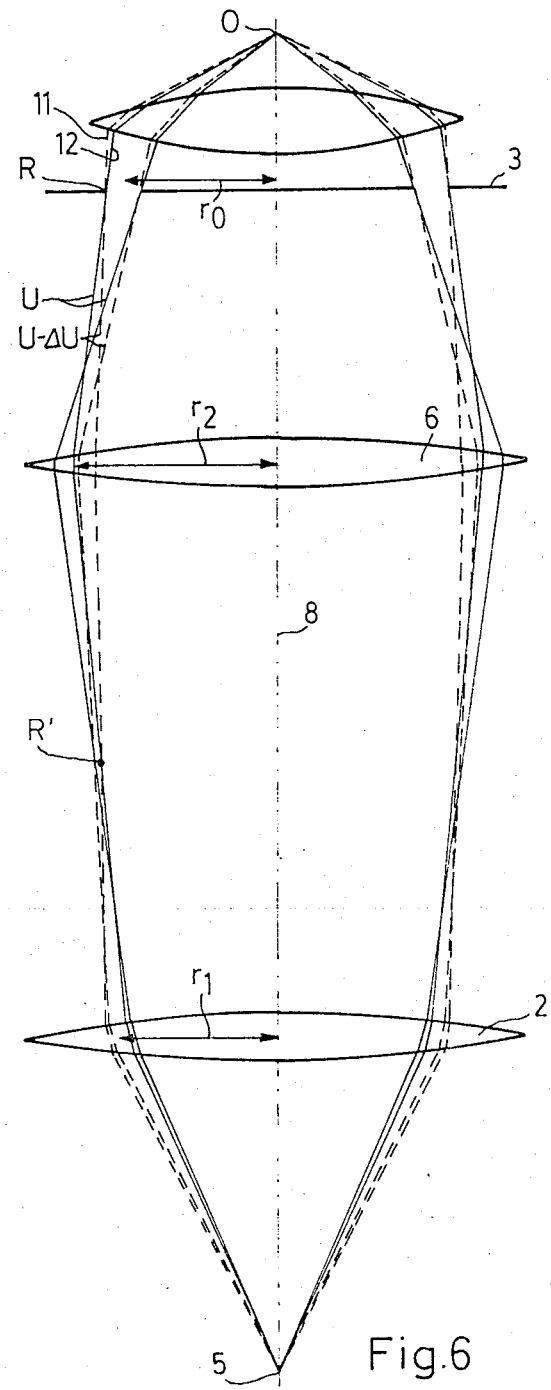
FIG. 6 is a ray diagram of the equivalent to the system of FIG. 5 in which the lenses are positioned to correct both spherical and chromatic errors.

FIG. 6 shows the ray configuration for imaging the axis point of the specimen plane through the spherically and chromatically corrected imaging system. Here, the ray path in the two supplementary lenses is shown simplified; both lenses are operated with slightly overtelescopic lens power and deflect the rays internally as is shown in FIG. 5.

Two electron beams, drawn with solid and broken lines, respectively, each emanate from the axis point 0 of the specimen plane in FIG. 6 to both sides of the optical axis. These beams differ by their beam voltage $U$ and $U - \Delta U$, respectively, and are limited by the ring diaphragm 3 behind objective lens 1. In the following discussion only the two beams to the left of the optical axis will be considered.

The disturbing influence of the aperture error of the objective lens on the course of the two zone beams of different beam voltage is compensated by the influence of the aperture errors of the two supplementary lenses in the same manner as was shown for a zone beam above.

Compensation for the effect of color error of the objective lens by the color errors of the supplementary lenses will be explained with reference to the outer peripheral rays 11 and 12 (as seen in the objective). The term "color" as used herein generally refers to the wavelength of charged particles in the visible light range. These rays are distinguished by the fact that they pass through the ring diaphragm 3 behind the objective lens just at the outer edge R and intersect there. Ray 11, drawn with broken lines, has the smaller beam voltage $U - \Delta U$ and is deflected by the objective lens 1 more strongly because of the color error than the other ray 12 with the larger beam voltage U. The two rays pass through the objective lens at different radial distances from the axis, low-energy ray 11 ($U - \Delta U$) being further out than high-energy ray 12 (U). The effect of the second supplementary lens 6, which compensates the color error of the objective, results from the fact that low-energy ray 11 passes through this lens closer to the axis than high-energy ray 12 and is therefore deflected less by the color error of lens 6.

The two rays intersect once more at the point R' behind second supplementary lens 6 and ahead of first supplementary lens 2. They therefore enter first supplementary lens 2 in the same relationship with respect to distance from the axis as in the objective lens 1. The effect of the color error of lens 2 on the ray deflection must also be compensated by the second supplementary lens 6. The necessary color correction by the second supplementary lens to achieve achromatisne is indicated mathematically by the fact that the color error coefficient of the second supplementary lens has a negative sign in the linear equations for the color error coefficients of the three lenses.

With respect to the correction of the color error of the objective lens zone limited by the ring diaphragm, just as in the case of the aperture error correction, it is advantageous if the two supplementary lenses operate at approximately telescopic lens power to obtain a design length that is not excessive.

With the aid of an example we will now show which parameters of the imaging system can be given independently and which other parameters are thereby fixed, if the image is to be corrected spherically and chromatically, and the sine condition is to be met. The example shows at the same time the capability of a corrected electron beam imaging system according to the invention.

Given are:
1. beam voltage $U = 10$ kV,
2. objective lens data:
   a. focal length $f = 0.8$ mm,
   b. aperture error coefficient $C_\ddot{o} = 0.5$ mm,
   c. color error coefficient $C_F = 0.6$ mm.
   (These characteristics are possessed by a single-field condenser objective with $S = 2.5$ mm and $D = 2$ mm, as long as the pole pieces are magnetically unsaturated),
3. data for the supplementary lenses (with pole piece geometry chosen as $S/D = 1$ and telescopic lens power):
   a. lens power parameter, $B^2$ spalt $D^2/U$ [$kG^2 mm^2/kV$] = 73
   b. gap induction, $B_{spalt} = 20$ kG,
   c. aperture error parameter $C_\ddot{o} \propto /f^4 D^3 = 20$
   d. color error parameter $C_F \propto /f^2 D = 3.5$
4. distances of the supplementary lenses from the objective:
   a. $z_1 = 500$ mm. where $z_1$ is the distance of the first supplementary lens from the objective and corresponds to the length of the imaging system,
   b. $z_2$ = variable, where $z_2$ is the distance of the second supplementary lens from the objective.

From these given characteristics, all other quantities of the imaging system can be calculated.

Figure 7:
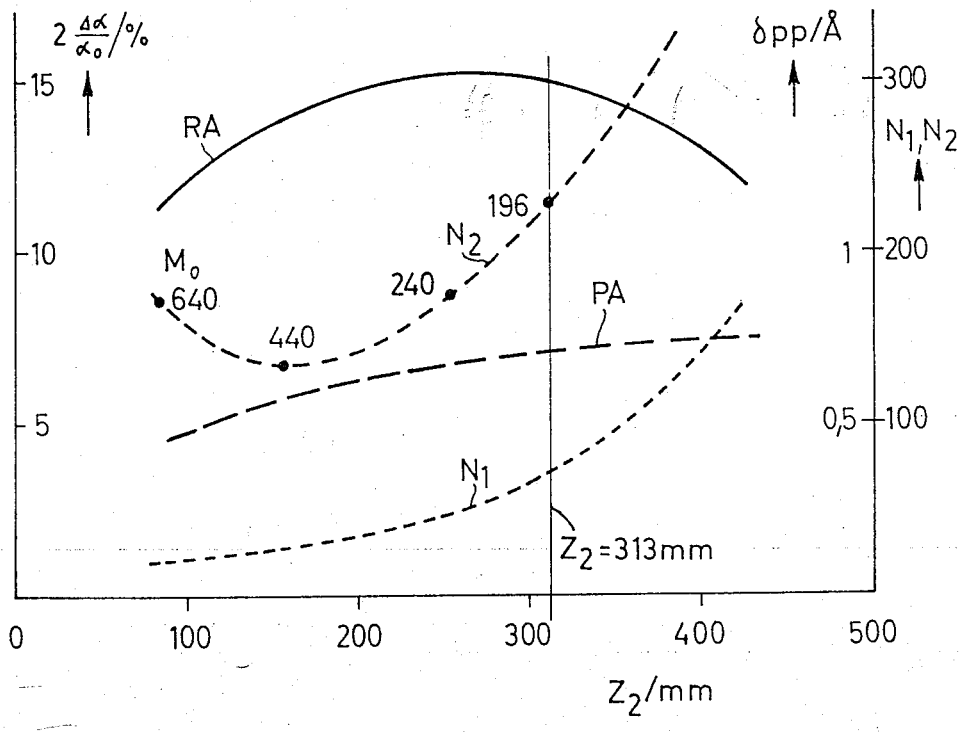
FIG. 7 is a plot of imaging system parameters as a function of the location of the second supplementary lens of the invention.

In FIG. 7, the following quantities which characterize the capability of the imaging system are plotted as functions of the position of the second supplementary lens:

A. Relative ring diaphragm aperture, $2\Delta\alpha/\alpha_o$ (Curve RA). This curve reaches a maximum of about 15 percent when the second supplementary lens is arranged approximately halfway between the objective lens and the first supplementary lens. For imaging with the objective alone without supplementary lenses, the relative ring aperture is restricted to $2\Delta\alpha/\alpha_o = 2$ percent for the same inclination $\alpha_o$ of the principal ray in the specimen plane, if the wave aberration in the ring zone is not to exceed the value $\lambda/4$. By correcting the aperture error of the objective in the vicinity of the principal surface of the hollow beam, the width of the ring, which is limited by the $\lambda/4$ condition, can therefore be increased by a factor 7 to 8. The condition on which curve RA is based (i.e., for a wave aberration W for a sharp image) reads $W = a \Delta^4 \alpha \leq \lambda/4$. Through suitable choice of the parameters of the imaging system, a dependence of the wave aberration upon $\Delta\alpha$ of the form, $W = a \Delta^4 \alpha + b \Delta^2 \alpha \leq \lambda/4$ can be obtained, a and b carrying opposite signs. The permissible ring aperture $2\Delta\alpha$ is thereby increased by a factor of 1.41, from 15 to 21 percent.

B. Point resolution $\delta pp$ for two incoherently radiating points (Curve PA).

At the maximum of the curve RA it is 0.7 A. Under otherwise equal conditions one obtains a better point resolution at beam voltages higher than 10 kV, for instance, $\delta pp = 0.26$ A for $U = 40$ kV. However, the relative ring aperture drops to $2\Delta\alpha/\alpha_o \approx 10$ percent.

C. Number N of image points resolved on the diameter of the field of view. N is inversely proportional to the deviation of the rays of the zone beam from the sine condition, i.e., the better the ratio $M = \sin\alpha/\sin\psi$ for each individual ray of the zone beam agrees with the ratio $M_o = \sin\alpha_o/\sin\psi_o$ of the principal ray, the more image points are resolved, $N \sim 1/(M - M_o) = 1/\Delta M$. In FIG. 7, two curves $N_1$ and $N_2$ are given for the number of image points resolved; these curves differ by the relation between $\Delta M$ and the ring aperture $\Delta\alpha$:

1. Curve $N_1$ was calculated for a real image, magnified 25 times, by the imaging system consisting of an objective lens and two supplementary lenses. For it the condition $\Delta M \approx \Delta^3 \alpha$ applies. At the maximum of the curve RA one obtains $N_1 \approx 70$ image points per diameter. It is not advisable to choose a greater image ratio because with increasing magnification, the deviation $\Delta M$ from the sine condition also increases.

2. Curve $N_2$ was calculated for a virtual image by the imaging system consisting of an objective and first and second supplementary lens, the scale of magnification being determined solely by the other data given above under one to four. For the curve $N_2$, $\Delta M \sim \Delta^4 \alpha$ applies. The deviation from the sine condition is therefore smaller by one power in $\Delta \alpha$, and the number of image points per diameter increases by factors of three to 10 (as compared with $N_1 \approx 70$ for curve $N_1$).

When designing an imaging system, one will strive for a large ring aperture (Curve RA) as well as for the largest possible number of image points per diameter (Curve $N_2$). An appropriate compromise is obtained, as shown in FIG. 7, for a position of the second supplementary lens at $z_2 = 313$ mm. The magnification is then $M_o = +196$.

Several values of magnification obtained for other positions of the second supplementary lens are entered as parameters next to Curve $N_2$. These are in all cases large, virtual magnifications.

Figure 8:
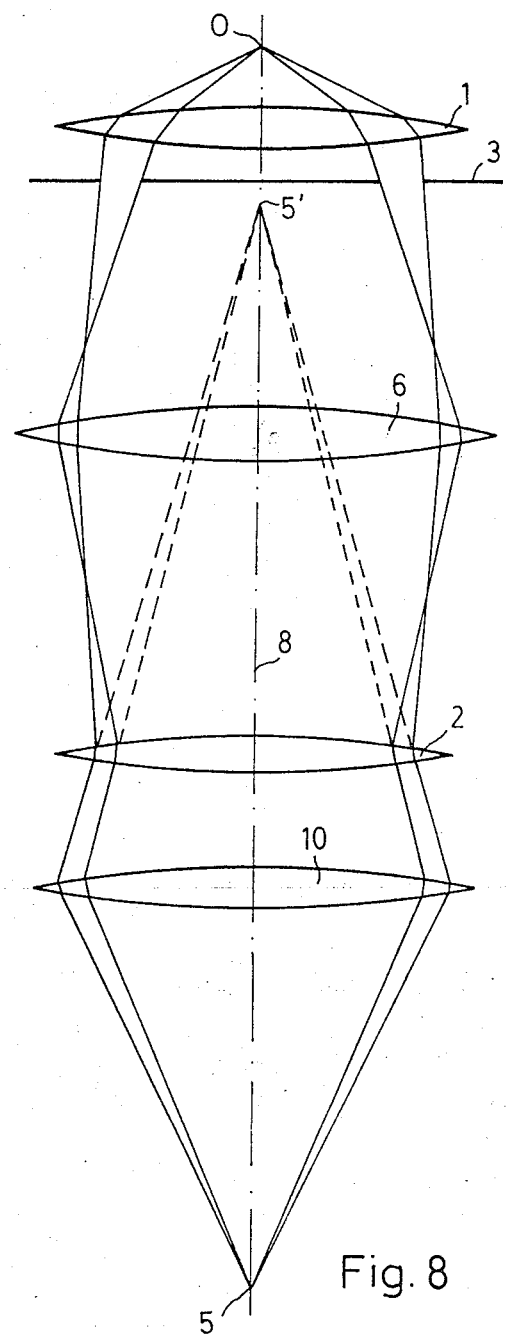
FIG. 8 is a ray diagram of an alternate embodiment of the invention employing a third supplementary lens.

By adding a third supplementary lens 10 behind the first supplementary lens, a real image can be generated, and the ring aperture can be enlarged further, for the reasons mentioned above. A ray configuration for such a system is shown in FIG. 8, in which the same reference symbols are used as in FIG. 2. It will be seen from FIG. 8 that the hollow beam is focused virtually on an axis point 5' by the first supplementary lens 2.

Distances from the objective $z_1 = 500$ mm and $z_2 = 313$ mm for the first and second supplementary lenses, respectively, yield the following values for these lenses: pole piece bore diameters and gap widths are $D_1 = S_1 = 1.36$, and $D_2 = S_2 = 2.56$; focal lengths are $f_1 = +40$ mm and $f_2 = +428$ mm, respectively. The positive signs of the focal lengths signify that both lenses are operated with less than telescopic lens power. The aperture and color error coefficients are fixed because of the relations $(C_o / f^3) D^3 = 20$ and $(C_F / f^2) D = 3.5$.

The lenses with approximately telescopic lens power, symbolized in FIG. 5 in each case by two lens-shaped cross sections, are usually magnetic lenses with only one lens gap and correspondingly high excitation. Alternatively, the supplementary lenses 2 and 6, and possibly also 10, can be designed as dual lenses, each with two gaps in series, in order to cancel image rotation.

What is claimed is:

1. In a charged particle imaging system of the type having an objective lens; an annular diaphragm behind the objective lens for stopping, except for an annular aperture zone, rays transmitted from a point on the axis in an object plane located in front of the objective lens so as to form a hollow beam, the rays of said beam generating a first annular caustic surface behind the diaphragm; and a first supplementary lens behind the first annular caustic surface for focusing the hollow beam at a point on the axis, the improvement comprising:
a second supplementary lens, having a focal length that is large in comparison to that of the objective lens, located between the first caustic surface and the first supplementary lens for generating a second annular caustic surface in front of the first supplementary lens.

2. The imaging system of claim 1 wherein the first supplementary lens also has a large focal length as compared to the objective lens for the purpose of magnified imaging.

3. The imaging system of claim 1 wherein the annular zone of the diaphragm has a radial width such that the wave aberration of the hollow beam is maximally $\lambda/4$, where $\lambda$ is the wavelength of the imaging radiation.

4. The imaging system of claim 1, further comprising:
a third supplementary lens having a focal length large as compared to the objective lens and located behind the first supplementary lens.

5. The imaging system of claim 4 wherein the first supplementary lens focuses the hollow beam virtually at a point on the axis in front of said first supplementary lens so that the image generated by the objective lens and the first and second supplementary lenses is a magnified virtual image.

6. The imaging system of claim 1 wherein the first and second supplementary lenses are positioned in relation to the objective lens so as to satisfy the condition:

$$C_{F\,obj} (r_o/f_o)^2 + C_{F_1} (r_1/f_1)^2 - C_{F_2} (r_2/f_2)^2 = 0,$$

where $C_{F\,obj}$, $C_{F_1}$, $C_{F_2}$, are the color error coefficients for infinite magnification of the objective and the first and second supplementary lens, respectively; $f_o$, $f_1$ and $f_2$ are the corresponding focal lengths; $r_1$, $r_2$ are the radial distances from the axis of the principal surface of the hollow beam as it enters the supplementary lenses; and $r_o$ is the radial distance from the axis of the principal surface of the hollow beam in the plane of the annular diaphragm, which is assumed to be in the field-free space.

7. The imaging system of claim 1 wherein the objective lens and the first and second supplementary lenses comprise magnetic lenses, and the first and second supplementary lenses have approximately telescopic lens power.

* * * * *

UNITED STATES PATENT OFFICE
CERTIFICATE OF CORRECTION

Patent No. 3,795,813              Dated March 5, 1974

Inventor(s) Wolfgang Kunath

It is certified that error appears in the above-identified patent and that said Letters Patent are hereby corrected as shown below:

In the Foreign Application Priority Data change date upon which claim for priority is based from "March 16, 1973" to --March 16, 1972--

In Column 4, line 41, change "Axis point 9" to --Axis point $0$--

In Column 4, line 56, change "$M_o = \sin \varepsilon_0 / \sin \gamma_0$" to --$M_o = \sin \alpha_0 / \sin \gamma_0$--

In Column 5, line 49, change "$C_o$ being" to --$C_o^*$ being--

In Column 6, line 43, change

"$C_{Fobj} (r/f_o)^2 + C_{F1} (r_1/f_1)^2 - C_{F2}(r_2/f_2)^2 = 0$" to

--$C_{Fobj} (r_o/f_o)^2 + C_{F1} (r_1/f_1)^2 - C_{F2}(r_2/f_2)^2 = 0$--

Change the Title from "CHANGED PARTICLE OPTICAL IMAGING SYSTEM" to --CHARGED PARTICLE OPTICAL IMAGING SYSTEM--

Signed and sealed this 18th day of March 1975.

(SEAL)
Attest:

RUTH C. MASON
Attesting Officer

C. MARSHALL DANN
Commissioner of Patents
and Trademarks